(12) United States Patent
Riordan

(10) Patent No.: US 9,731,155 B2
(45) Date of Patent: Aug. 15, 2017

(54) FLAME ARRESTER WITH POROUS SLEEVE

(71) Applicant: EMPYREUS SOLUTIONS LLC, Anchorage, AK (US)

(72) Inventor: Brian Riordan, Brookshire, TX (US)

(*) Notice: Subject to any disclaimer, the term of this patent is extended or adjusted under 35 U.S.C. 154(b) by 0 days.

(21) Appl. No.: 15/245,893

(22) Filed: Aug. 24, 2016

(65) Prior Publication Data

US 2016/0361581 A1 Dec. 15, 2016

Related U.S. Application Data

(63) Continuation-in-part of application No. 14/875,977, filed on Oct. 6, 2015, now Pat. No. 9,511,247, which is a continuation-in-part of application No. 14/479,057, filed on Sep. 5, 2014, now Pat. No. 9,205,292.

(51) Int. Cl.
| | |
|---|---|
| *A62C 3/06* | (2006.01) |
| *A62C 4/00* | (2006.01) |
| *F16K 15/03* | (2006.01) |
| *F23D 14/82* | (2006.01) |
| *F23K 5/16* | (2006.01) |

(52) U.S. Cl.
CPC ............... *A62C 3/065* (2013.01); *A62C 4/00* (2013.01); *F16K 15/033* (2013.01); *F23D 14/825* (2013.01); *F23K 5/16* (2013.01)

(58) Field of Classification Search
CPC ........ B65D 90/22; B65D 90/28; B65D 90/30; A62C 2/06; A62C 3/06; A62C 3/065; A62C 4/00; F16K 17/00; F02B 77/10
USPC ........ 220/88.1–88.3; 215/40; 169/44, 56–57, 169/66; 222/189.01; 138/37, 39, 41
See application file for complete search history.

(56) References Cited

U.S. PATENT DOCUMENTS

| | | |
|---|---|---|
| 1,681,698 A | 8/1928 | Brooks |
| 2,701,805 A | 2/1929 | Dunn et al. |
| 1,826,487 A | 10/1931 | Wiggins |
| 1,960,043 A | 5/1934 | Anschicks |
| 2,049,573 A | 6/1936 | Hornberger |
| 2,087,170 A | 7/1937 | Stephenson |
| 1,839,655 A | 1/1952 | Dobbins |
| 2,789,238 A | 4/1957 | Staak |
| 3,287,094 A | 11/1966 | Brownell |
| 3,356,256 A | 12/1967 | Szego |
| 3,927,797 A | 12/1975 | Flider |

(Continued)

FOREIGN PATENT DOCUMENTS

WO  WO 2012097060 A2 * 7/2012 ............... A62C 4/00

*Primary Examiner* — Chun Cheung
*Assistant Examiner* — Brijesh V. Patel
(74) *Attorney, Agent, or Firm* — Richard C. Litman

(57) ABSTRACT

The flame arrester is optimized for installation within fuel containers. The flame arrester has an optional elongate, generally cylindrical skeletal frame having opposing first and second ends. The first end is configured as a mounting flange adapted for permanent, immovable installation within the tank or container and the second end may include a spring-loaded check valve. The frame is covered by a woven or nonwoven textile material, or alternatively, by a porous or foraminous sheet material. Fuel and vapors pass through the cylindrical textile wall, the porosity of the textile serving to prevent flame propagation through the textile material. The pore size is between 0.4 mm and 3.2 mm.

2 Claims, 10 Drawing Sheets

(56) References Cited

U.S. PATENT DOCUMENTS

| | | |
|---|---|---|
| 4,566,589 A | 1/1986 | Poschinger |
| 4,597,504 A | 7/1986 | Witt |
| 4,645,099 A | 2/1987 | Gillispie et al. |
| 4,909,730 A | 3/1990 | Roussakis et al. |
| 5,564,608 A | 10/1996 | Cooper |
| 7,152,764 B2 | 12/2006 | Mack, Jr. |
| 7,241,137 B2 | 7/2007 | Leinemann et al. |
| 2011/0233207 A1 | 9/2011 | Okawada et al. |
| 2012/0189966 A1 | 7/2012 | Brooker |
| 2012/0273239 A1 | 11/2012 | Brennan |
| 2013/0008899 A1 | 1/2013 | Hisadomi et al. |
| 2013/0320009 A1 | 12/2013 | Cray |
| 2015/0001217 A1 | 1/2015 | Cray |

\* cited by examiner

FLAME ARRESTER WITH POROUS SLEEVE

CROSS-REFERENCE TO RELATED APPLICATION

This application is a continuation-in-part of U.S. application Ser. No. 14/875,977 filed Oct. 6, 2015, now U.S. Pat. No. 9,511,247, which is a continuation-in-part of U.S. application Ser. No. 14/479,057, filed Sep. 5, 2014, now U.S. Pat. No. 9,205,292.

BACKGROUND OF THE INVENTION

1. Field of the Invention

The present invention relates generally to safety devices for flammable fuels, and particularly to a flame arrester for permanent installation within a liquid fuel container, tank, or the like, or in the neck or spout thereof.

2. Description of the Related Art

Flame arresters are well known for installation in elongate pipes that carry various flammable gases that may be subject to mixing with atmospheric oxygen and a possible ignition source. In many instances, flame arresters are required in such conditions. Generally, the ignition of the flammable substance within such a pipe results in a relatively high-pressure wave due to its confinement within the pipe. As a result, flame arresters configured for such installations generally comprise a diametric disk of porous material that is disposed completely across the interior of the pipe. The flame arrester material generally comprises a fine mesh or other porous configuration of thermally conductive material, usually metal, to quench the flame, and the fine porous passages therethrough serve to reduce the velocity of flame travel through the mesh disk. The metal structure also provides the structural strength required to withstand the relatively high-pressure front that occurs in the event of ignition within such a confined space.

However, there are many other environments in which ignition of a flammable vapor is possible, where the vapor is not confined to such relatively long pipes, tubes, and the like. Examples include, but are not limited to, portable fuel containers (e.g., gas cans) having relatively short dispensing spouts, and automotive fuel tanks having relatively short filler necks. The installation of conventional diametric metal flame arrester discs within such spouts and necks is generally inconvenient, as such devices (in a fuel tank filler neck) tend to prevent the insertion of a fuel nozzle therein, and in any case, the relatively fine porosity greatly restricts the flow of fuel therethrough. As a result, the users of such devices often remove the flame arrester from the spout or neck, thereby negating any potential safety that would otherwise be provided by such a device.

Thus a flame arrester solving the aforementioned problems is desired.

SUMMARY OF THE INVENTION

The flame arrester generally comprises an elongate open frame of fuel-resistant flexible plastic material, the frame having a generally skeletal cylindrical configuration and opposing first and second ends. The first end comprises a mounting flange adapted to install permanently and immovably within a portable fuel container or a fuel tank. The flame arrester may be installed at the juncture of the spout or neck of such a container or tank, or may be installed within the spout or neck due to its relatively small diameter.

The frame is covered by a synthetic woven or nonwoven textile material, or other foraminous or perforated nonmetallic material, that is heat-resistant and also chemically resistant to fuel. The textile or other perforated material may be stretched tautly or loosely over the frame or otherwise secured in place over the frame, the amount or degree of tension serving to regulate the porosity of the material in accordance with maximum experimental safe gap (MESG) standards. The relatively long cylindrical configuration provides significant surface area for the foraminous or perforated material to allow reasonably free flow of fuel through the cylindrical wall of the material, while simultaneously allowing fuel vapors and/or other gases to pass through the material.

In one embodiment, the second end of the flame arrester (i.e., the end opposite the mounting flange) comprises an impervious disk, and the textile material comprises a sleeve disposed about the frame between the two ends thereof. In another embodiment, at the second end of the frame, the flame arrester is open, and the textile cover comprises a sock with a closed but porous end that fits snugly over the open structure of the frame's second end. In still another embodiment, a plurality of retaining rings is disposed about the frame and its textile cover, each of the rings having a plurality of inwardly extending fingers. The fingers serve as retainers to secure axially disposed wires between axial ribs of the frame, and the textile cover is forced down between the ribs by the overlying wires. This configuration provides greater surface area for the textile cover without requiring an increase in diameter for the frame.

These and other features of the present invention will become readily apparent upon further review of the following specification and drawings.

DETAILED DESCRIPTION OF THE PREFERRED EMBODIMENTS

The flame arrester comprises various embodiments of a relatively small, elongate cylindrical device particularly adapted for permanent and immovable installation within a fuel container, such as a portable fuel can or a vehicle fuel tank. The flame arrester may be installed within the body of the can or tank, or within the dispensing spout of the can or filler neck of the tank. Since any flame front that might develop in such relatively small containers and their short spouts or necks would be relatively weak and low pressure, the flame arrester may be constructed of lighter, non-metallic materials, as opposed to flame arresters generally required for installation in gas pipelines and the like.

Figure 1:
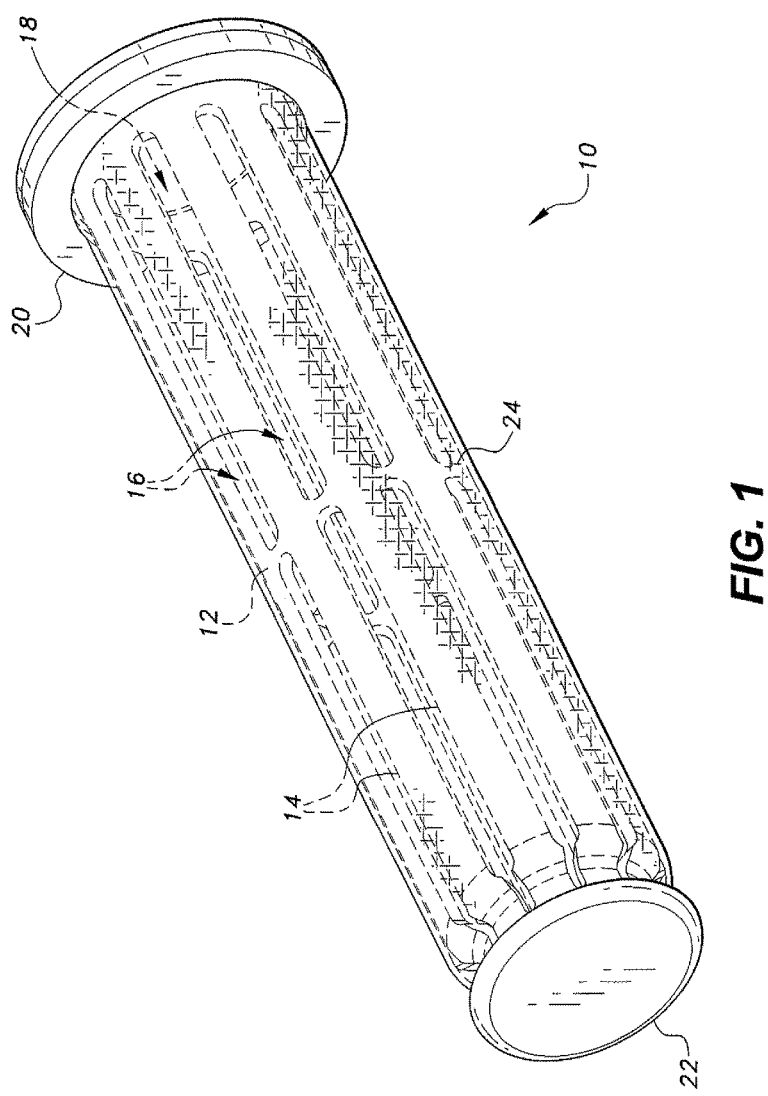
FIG. 1 is a perspective view of a first embodiment of a flame arrester according to the present invention, illustrating its structure and configuration.
Figure 2:
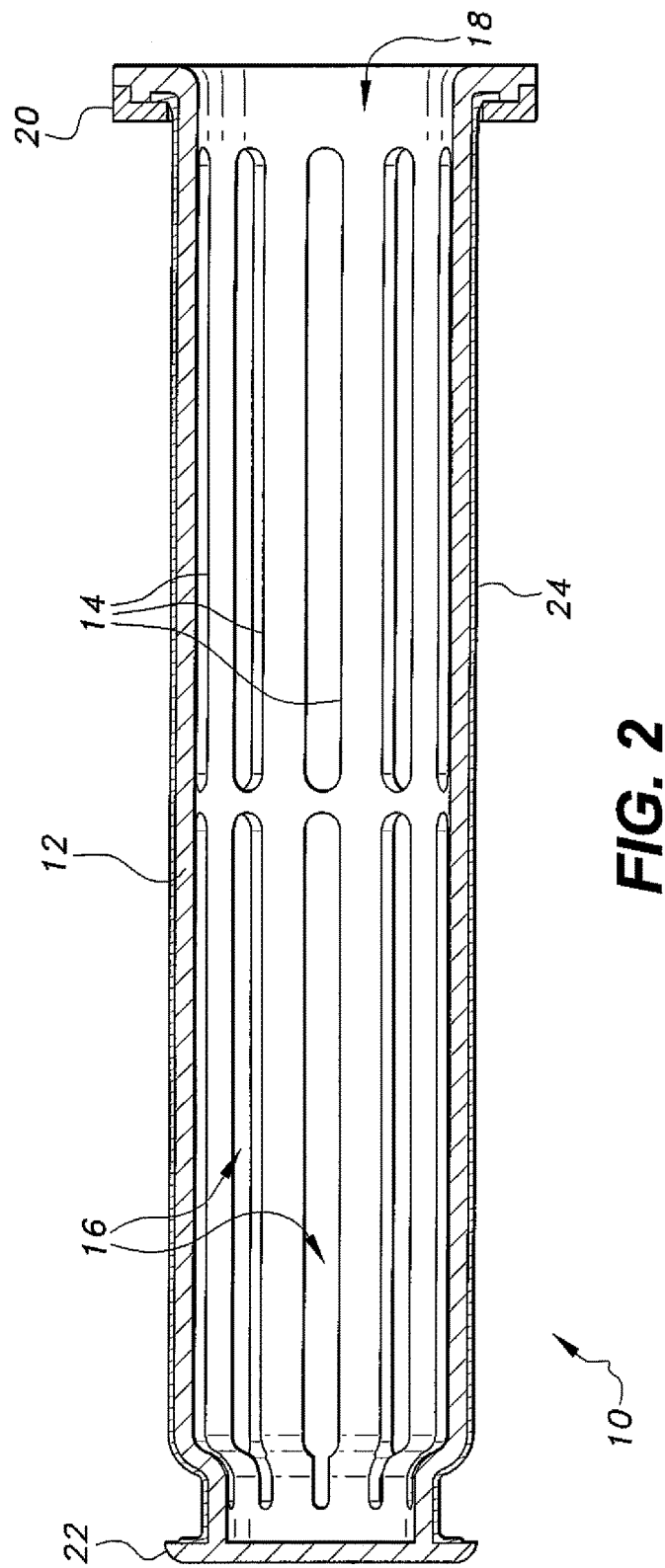
FIG. 2 is a side view in section of the flame arrester of FIG. 1, illustrating further details thereof.
Figure 3:
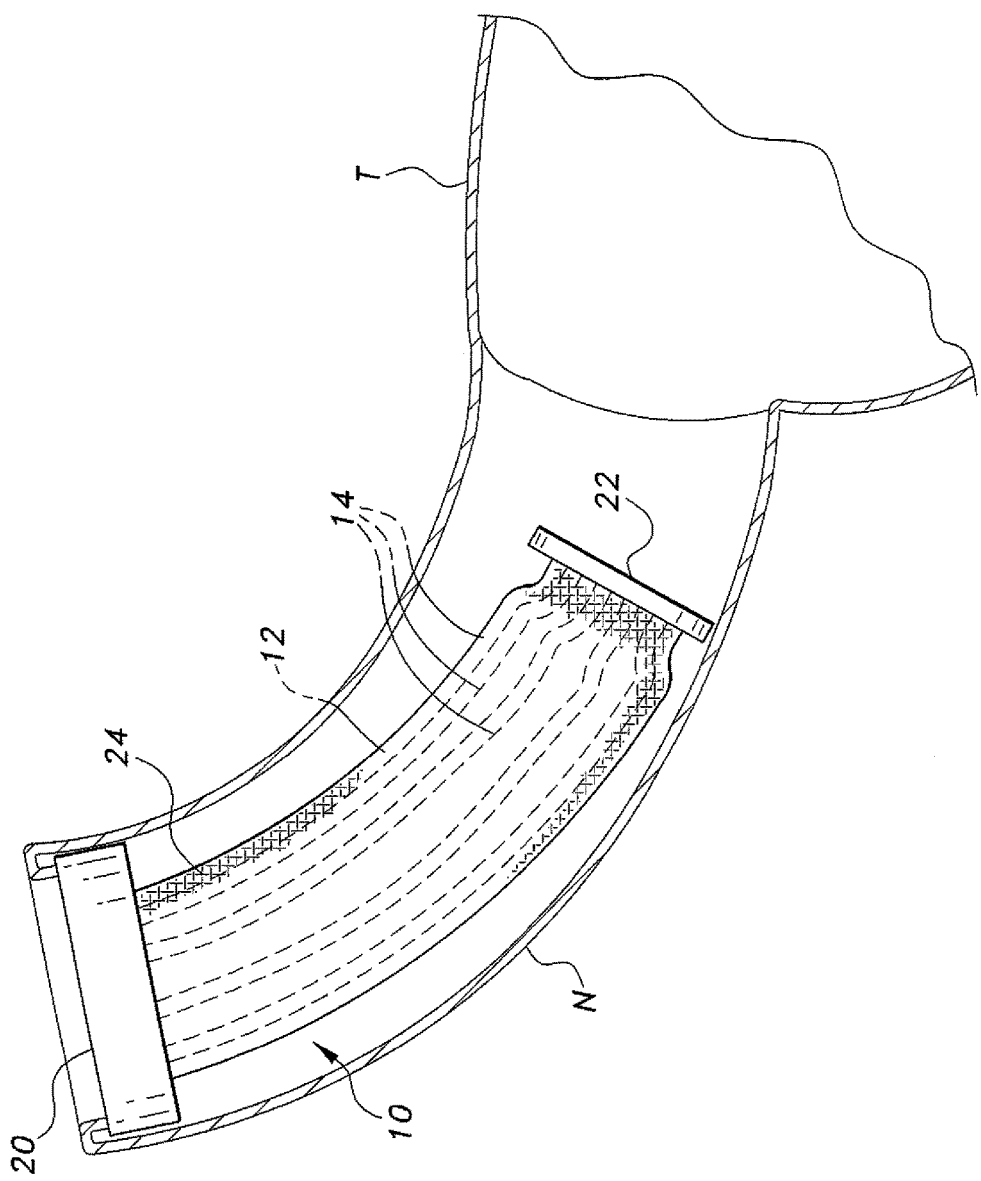
FIG. 3 is an environmental side view in section showing the flame arrester of FIG. 1 installed within the curved filler neck of a fuel tank.

FIGS. 1 through 3 illustrate a first embodiment of the flame arrester, designated as flame arrester 10. The flame arrester 10 includes a skeletal frame 12 (more clearly shown in the side elevation view in section of FIG. 2) formed of a flexible, heat- and flame-resistant plastic material. Any of a number of different plastics may be used, e.g., nylon, high-density polyethylene (HDPE), or other heat- and fuel-resistant plastics. While such materials will melt and burn when heated sufficiently, they provide sufficient durability for relatively short duration flare-ups that might occur from a relatively small quantity of fuel in a relatively small container.

The frame 12 is an elongate, generally cylindrical structure, preferably formed of a number of axially parallel elongate and flexible ribs 14, which define a corresponding number of elongate slots or passages 16 therebetween. Alternatively, the ribs 14 may have a diagonal or spiral configuration to comprise a geodetic structure for the frame 12.

Figure 8:
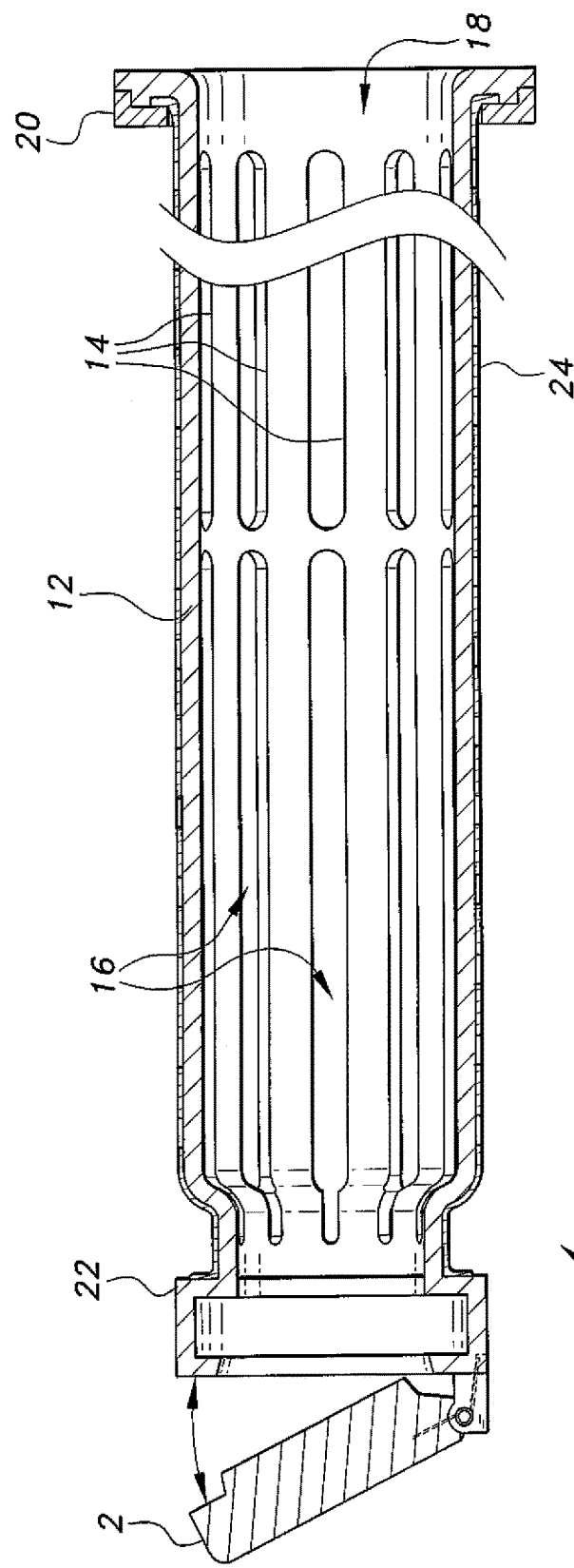
FIG. 8 is a side view in section of the flame arrester of FIG. 1, according to the present invention, illustrating the check valve at one end.

The cylindrical configuration of the frame 12 defines an open core 18 therein. The frame 12 has a first end 20 and second end 22. The first end 20 has a toroidal configuration and serves as a mounting flange for installing the flame arrester 10 within a fuel container or its spout or neck. The second end 22 is a closed, impervious disk or plug in the case of the flame arrester 10 of FIGS. 1 through 3. However, as shown in FIG. 8, the second end may include a valve, preferably a check valve 2. The check valve 2 can be a spring-loaded check valve as illustrated or other types of spring valves that will automatically close after it is opened to receive fuel therethrough. The check valve 2 will permit the insertion of a fuel nozzle therein, and then automatically close upon its removal.

The flame arrester frame 12 is covered with a tubular sleeve or cover 24 of flexible woven or non-woven textile material that may be applied in tension, i.e., stretched, over the ribs 14 of the frame 12 of the device. Alternatively, the sleeve or cover 24 may be formed of any suitable foraminous or perforated non-textile, nonmetallic sheet material. The textile material of which the cover 24 is formed is pre-selected to have porosity appropriate to the requirements of the operating environment for the flame arrester, including the composition and viscosity of the fuel (gasoline, alcohol, diesel fuel, etc.). Porosity, i.e., the spacing between adjacent fibers or pores of the cover material, is adjusted by proper selection of material and the tensile stretch (if any) of the material over the frame or ribs of the frame. The porosity is adjusted in accordance with the maximum experimental safety gap (MESG) that has been determined for the particular flammable substance with which the flame arrester 10 is being used. For example, the National Fire Protection Association standard 321 has determined gasoline to be a member of group D flammable fluids, having an MESG measuring 0.75 millimeters (mm). Most preferably, the textile or non-textile material used to form the cover of the present flame arrester 10 is applied over the frame 12 to provide porosity on the order of 0.4 mm up to about 0.9 mm, the pore size being selected according to the specifications of the particular flammable fluid with which the flame arrester 10 is used, i.e., a flame arrester intended for use with gasoline may have a textile material with a first pore size, a flame arrester intended for use with alcohol may have a textile material with a second pore size, etc. When ethanol or butane is used, for example, the porosity is 0.4 mm up to about 3.2 mm.

Figure 7:
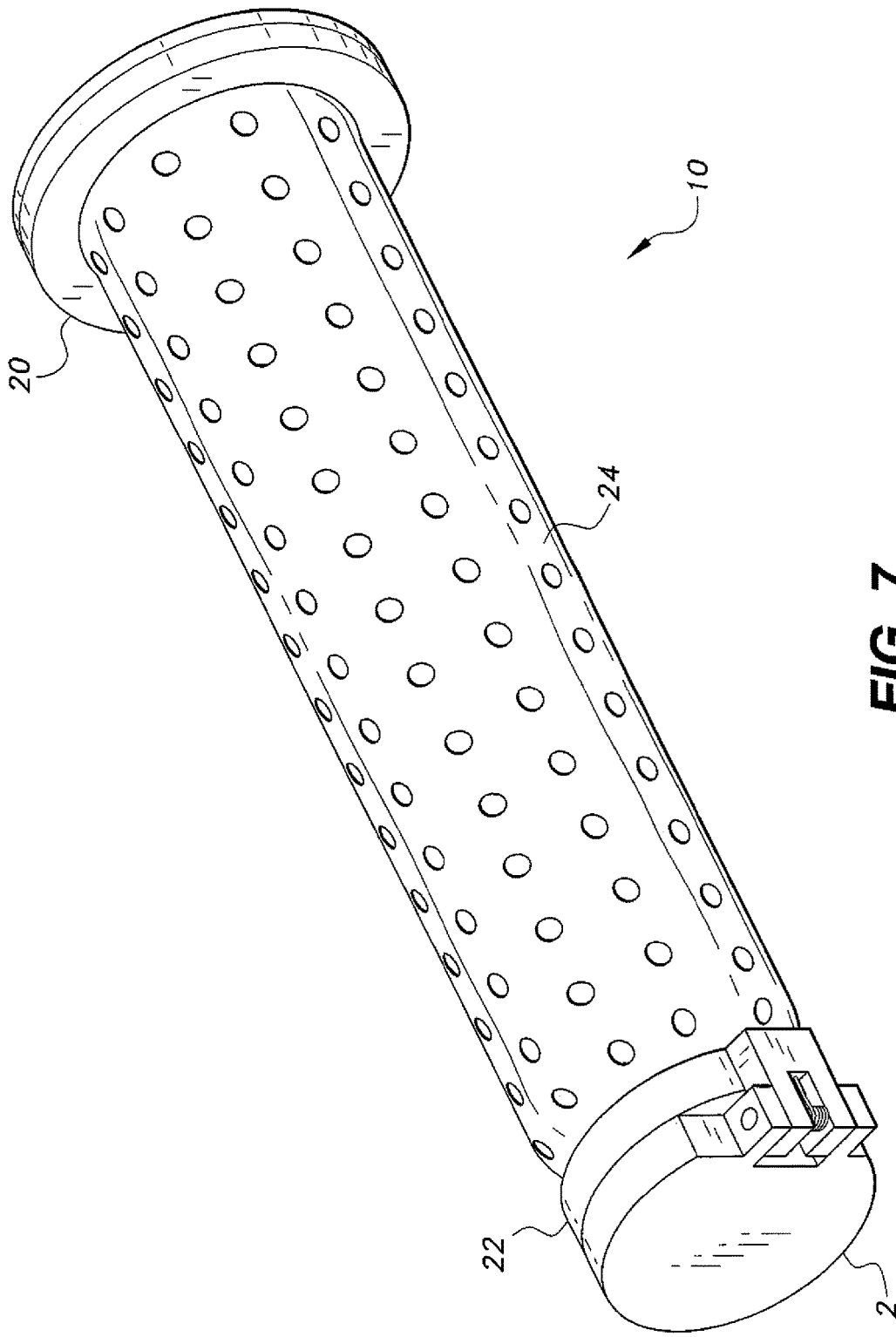
FIG. 7 is a perspective view of a flame arrester according to the present invention, illustrating the porous sheet material cover with a check valve at one end.

Accordingly, a wide variety of woven and non-woven textile or non-textile materials may be used to form the cover 24 of the flame arrester 10. A universal requirement is that the material be chemically resistant to the flammable fluid with which the flame arrester 10 is used, and that it provides some resistance to heat and flame. The cover 24 may be formed of such materials as woven or nonwoven glass fiber, woven or nonwoven aramid fiber (e.g., Kevlar®), woven or nonwoven carbon fiber, other heat-resistant and fuel-resistant synthetic fibers, or non-woven, non-textile, nonmetallic foraminous or porous sheet material, the latter type of cover being shown in FIG. 7 in use with a spring-loaded check valve 2.

FIG. 3 of the drawings provides an illustration of an exemplary installation of the flame arrester 10 within the curved filler neck N of a fuel container or tank T that forms a fuel container assembly. Such substantially closed fuel tanks T and their curved tubular filler necks N are nearly universally installed in motor vehicles. The flexible nature of the frame 12 and the textile cover 24 of the flame arrester 10 allows the flame arrester 10 to be flexed or bent for installation within the curved neck N of such a tank T. The second end 22 of the flame arrester 10 serves as a spacer to prevent the textile cover sleeve 24 from bearing against the inner surface of the filler neck N. In this manner, fuel is free to flow through the entire surface of the elongate cover 24 without impedance from the inner surface of the filler neck N, and there is still sufficient space between the smaller diameter second end 22 of the flame arrester 10 and the inner diameter of the tank neck N to allow fuel to flow and vapors to vent readily past the second end 22. Even though the diameter of the flame arrester 10 does not extend completely across the inner diameter of the filler neck N, the length of the flame arrester provides sufficient surface area for the textile cover sleeve 24 to provide adequate fuel and vapor flow therethrough with minimal impedance. Also, the inner diameter of the frame 12 is sufficiently wide to permit insertion of the spout of a fuel pump into the neck N to refill the tank T. While the second end 22 of the flame arrester 10 is shown positioned somewhat above the lower end of the filler neck N of the tank in FIG. 3, that need not be the case, and it may extend farther down the filler neck N and into the upper portion of the tank T, if desired. Such a longer flame arrester 10 provides a greater surface area for the textile or non-textile material through which the flammable liquid may flow, thus reducing resistance to reduce the time required for a given amount of liquid to flow through the flame arrester 10 and into the tank T or other container.

The mounting flange of the first end 20 may be seated within the conventional inwardly formed lip of the upper end of the filler neck N as shown, and/or may be secured using conventional mechanical fasteners (e.g., bolts, rivets, etc.). In such an installation, the flame arrester 10 is substantially captured within the filler neck N and cannot be removed without damage to either the flame arrester 10 or the filler neck N. The difficulty of removing the flame arrester 10, along with its minimal impedance to fuel and vapor flow and allowance for the insertion of a fuel nozzle therein, serve to greatly reduce the desire or need to remove the flame arrester 10, which would negate the safety provided by the flame arrester installation. Alternatively, the flame arrester 10 may be installed farther down within the tank T, if desired, to make removal of the flame arrester 10 even more difficult.

Figure 4:
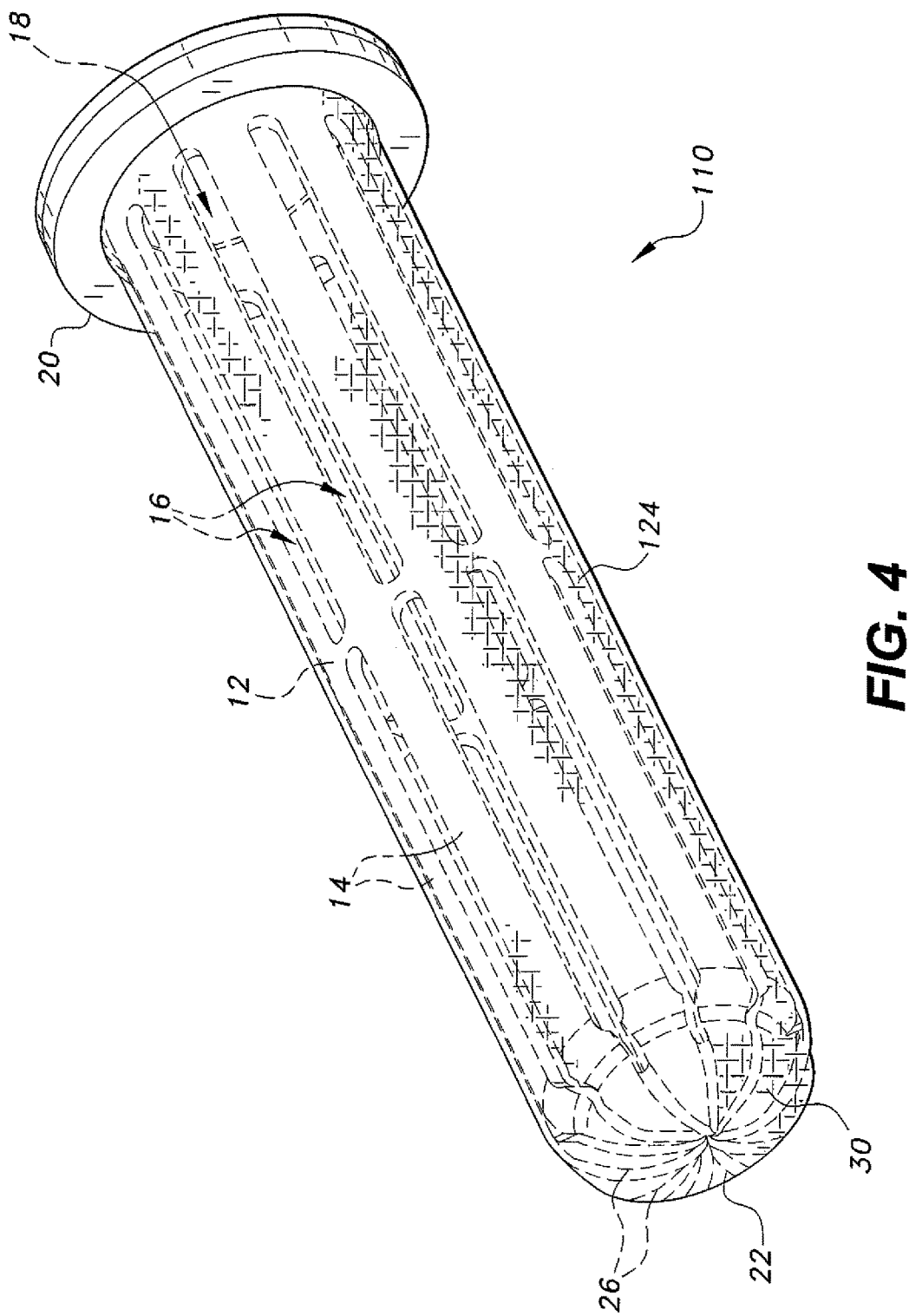
FIG. 4 is a perspective view of an alternative embodiment of a flame arrester according to the present invention, illustrating various features thereof.

FIG. 4 of the drawings provides a perspective view of an alternative embodiment of the flame arrester, designated as flame arrester 110. The majority of the components of the flame arrester 110 are identical to those of the flame arrester 10 of FIGS. 1 through 3, i.e., a skeletal frame 12 comprising a plurality of spaced apart, elongate parallel ribs 14 defining elongate passages 16 therebetween and an open core 18 therein, and opposed first and second ends 20 and 22. The frame 12 is covered by a flexible and porous textile or non-textile material 124 that is stretched tautly or loosely over the frame to provide the desired porosity of the material. However, rather than forming the second end 22 as a solid disk of material, the second end 22 of the flame arrester 110 is formed by curving and connecting the distal ends 26 of the ribs 14 to one another, generally at the axial center of the frame 12. The textile or non-textile cover 124 of the embodiment 110 of FIG. 3 is also somewhat different than the cover 24 of the embodiment 10 of FIGS. 1 through 3. Rather than comprising a sleeve with opposite open ends constrained by the two ends 20 and 22 of the frame 12, the cover 124 is configured similar to a sock, having a closed second end 30 that may fit tautly or loosely over the curved ends 26 of the ribs 14. This configuration provides some additional surface area for a cover 124 of a given length and diameter, and does not limit flow due to the imperforate second end disk 22 of the flame arrester 10 of FIGS. 1 through 3.

Figure 5:
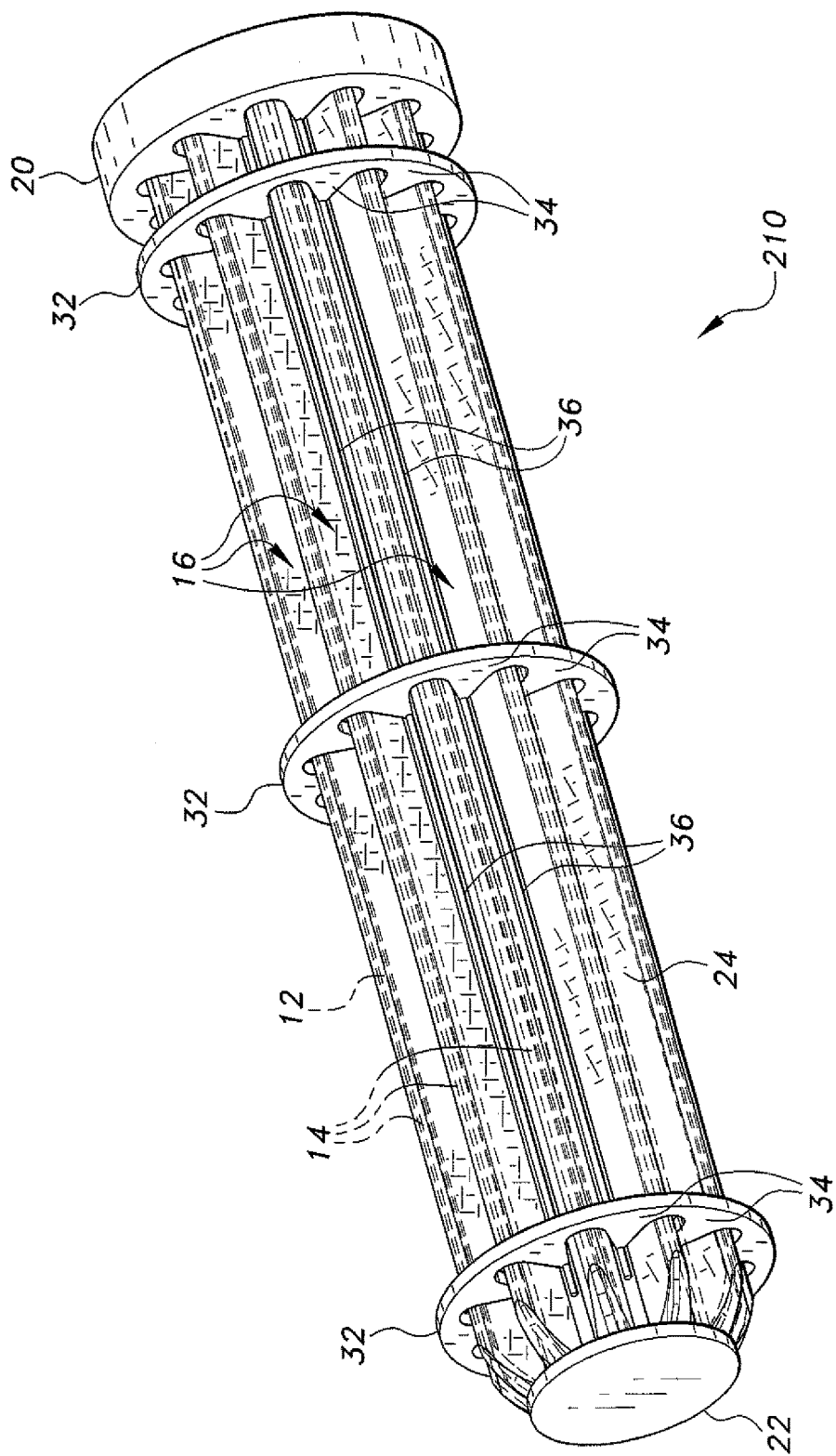
FIG. 5 is a perspective view of another alternative embodiment of a flame arrester according to the present invention, illustrating various details thereof.
Figure 6:
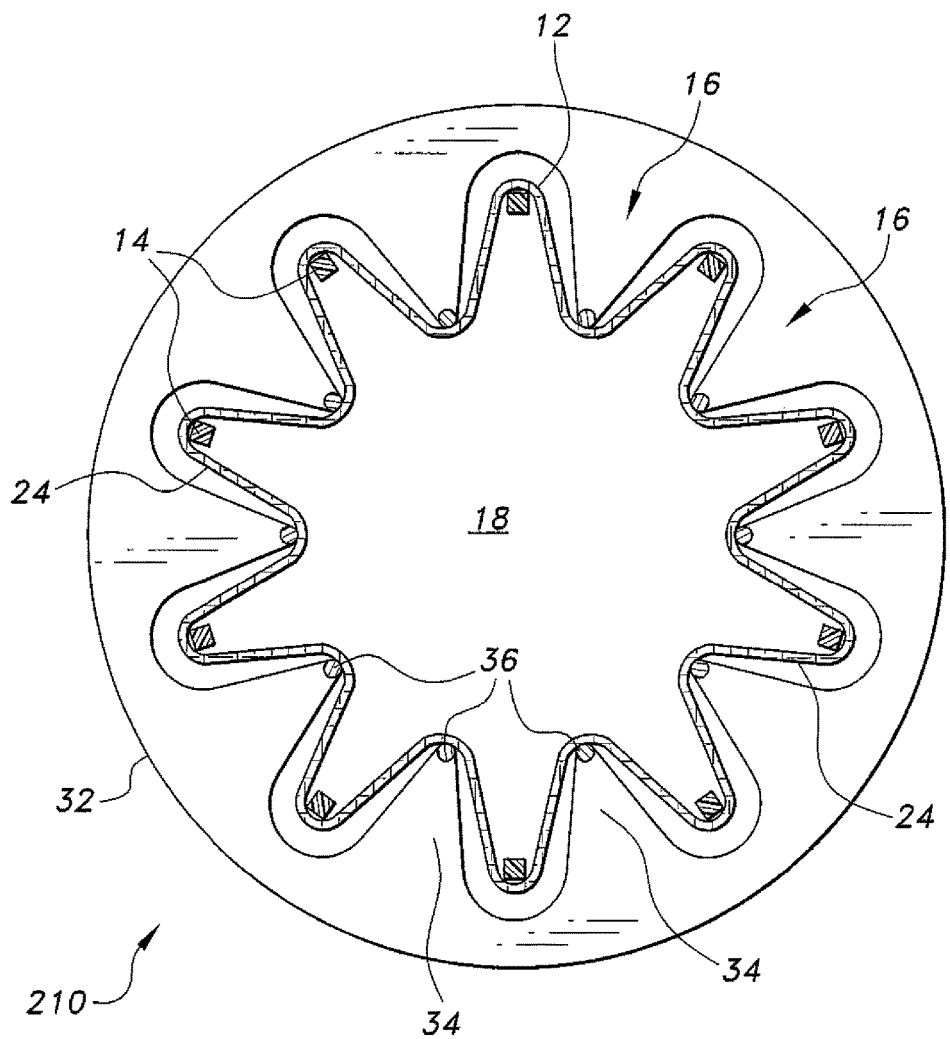
FIG. 6 is an end elevation view in section of the flame arrester of FIG. 5, illustrating further details thereof.

FIGS. 5 and 6 illustrate another embodiment of the flame arrester, designated as flame arrester 210. The flame arrester 210 is configured similar to the flame arrester 10 of FIGS. 1 through 3, i.e., having a skeletal frame 12 comprising a plurality of spaced apart, elongate parallel ribs 14 defining elongate passages 16 therebetween and an open core 18 therein (shown in FIG. 6), and opposed first and second ends 20 and 22. The frame 12 is covered by a flexible and porous textile or non-textile material 24 that may be stretched tautly or loosely over the ribs 14, as in the other embodiments. However, the cover 24 is pushed downward into the spaces or passages 16 between the ribs 14 by an external structure around the outside of the frame 12. A plurality of rings 32 (which may be snap rings, circlips, or C-shaped clips) is disposed about the generally cylindrical structure of the frame 12 at spaced intervals. Each of the rings 32 has a number of fingers 34 extending inwardly therefrom. In the embodiment shown, the number of fingers 34 of each ring 32 corresponds to the number of ribs 14 of the frame 12, so that one finger 34 of each ring 32 extends between adjacent ribs 14. The inward end of each of the fingers 34 has a flexible wire or rod 36 secured thereto. The wires 36 extend axially and parallel to the ribs 14 and passages 16 of the frame 12. As the wires 36 are held down within the passages 16 of the frame 12 between the ribs 14, the cover 24 is alternately stretched over each rib 14 of the frame 12, and then extends inward to wrap beneath each adjacent wire 36. FIG. 6 shows this arrangement in an end view in section. The cover 24 is clearly shown wrapping over a rib 14 of the frame 12, then inward to pass beneath a wire 36, back up to pass over an adjacent rib 14, and then back down to pass beneath an adjacent wire 36, etc. This arrangement greatly increases the surface area of the cover 24, thereby providing a larger porous surface for the fuel and/or vapor to pass through and reducing impedance of such flow accordingly. It will be seen that such an arrangement is also possible when the ribs 14 of the frame 12 have a diagonal or spiral configuration to provide a geodetic configuration for the frame 12.

Figure 9:
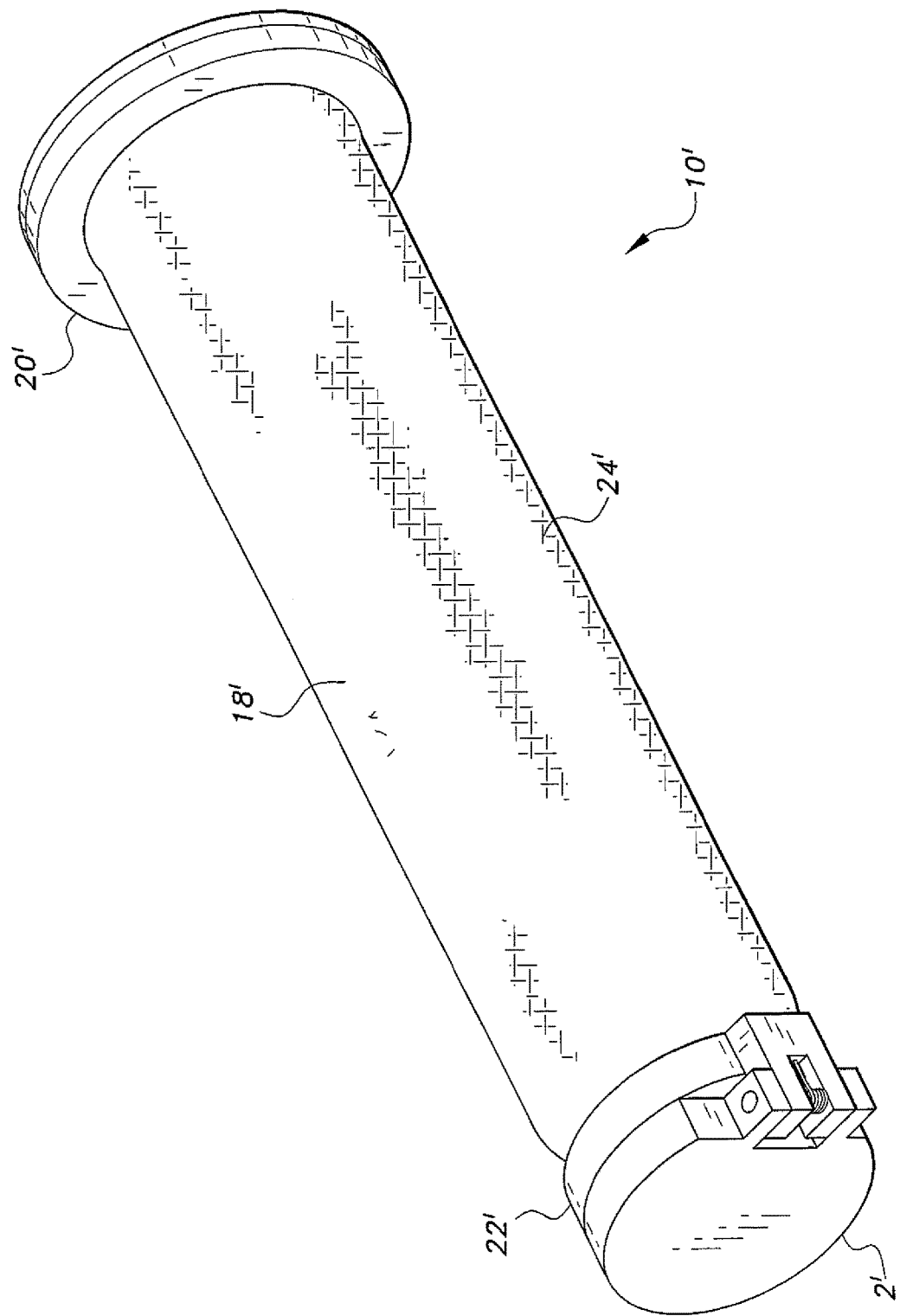
FIG. 9 is a perspective view of another alternative embodiment of a flame arrester according to the present invention, illustrating the porous sheet material cover with a check valve at one end.

FIG. 9 illustrates another embodiment of the flame arrester, designated as flame arrester 10'. The flame arrester 10' is configured similar to the flame arrester of FIGS. 1-3. However, in this embodiment, the flame arrester has removed the frame 12. That is, the flame arrester is solely a tubular sleeve or cover 24' of flexible woven or non-woven textile material. The textile material of which the cover 24' is formed (as well as all embodiments using a cover made of flexible woven or non-woven textile material), is pre-selected to have porosity appropriate to the requirements of the operating environment for the flame arrester, including the composition and viscosity of the fuel (gasoline, alcohol, diesel fuel, etc.). Porosity, i.e., the spacing between adjacent fibers or pores of the cover material, is adjusted by proper selection of material and the tensile stretch (if any) of the material over the frame or ribs of the frame. The porosity is adjusted in accordance with the maximum experimental safety gap (MESG) that has been determined for the particular flammable substance with which the flame arrester 10' is being used. Depending on the blend of gasoline tested (e.g. ethanol, butane, etc.) the pore size will vary. Most preferably, the textile the cover of the present flame arrester 10' is on the order of 0.4 mm up to about 3.2 mm, the pore size being selected according to the specifications of the particular flammable fluid with which the flame arrester 10' is used, i.e., a flame arrester intended for use with gasoline may have a textile material with a first pore size, a flame arrester intended for use with alcohol may have a textile material with a second pore size, etc.

Accordingly, a wide variety of woven and non-woven textile or non-textile materials may be used to form the cover 24' of the flame arrester 10'. A universal requirement is that the material be chemically resistant to the flammable fluid with which the flame arrester 10' is used, and that it provides some resistance to heat and flame. The cover 24' may be formed of such materials as woven or nonwoven glass fiber, woven or nonwoven aramid fiber (e.g., Kevlar®), woven or nonwoven carbon fiber, other heat-resistant and fuel-resistant synthetic fibers, or non-woven, non-textile.

The majority of the components of the flame arrester 10' are identical to those of the flame arrester 10 of FIGS. 1 through 3, i.e., an open core 18' therein, and opposed first and second ends 20' and 22'. The second end can have a check valve 2' if desired. It is further contemplated that the second end cap can be either porous or impervious if a check valve is not desired.

Figure 10:
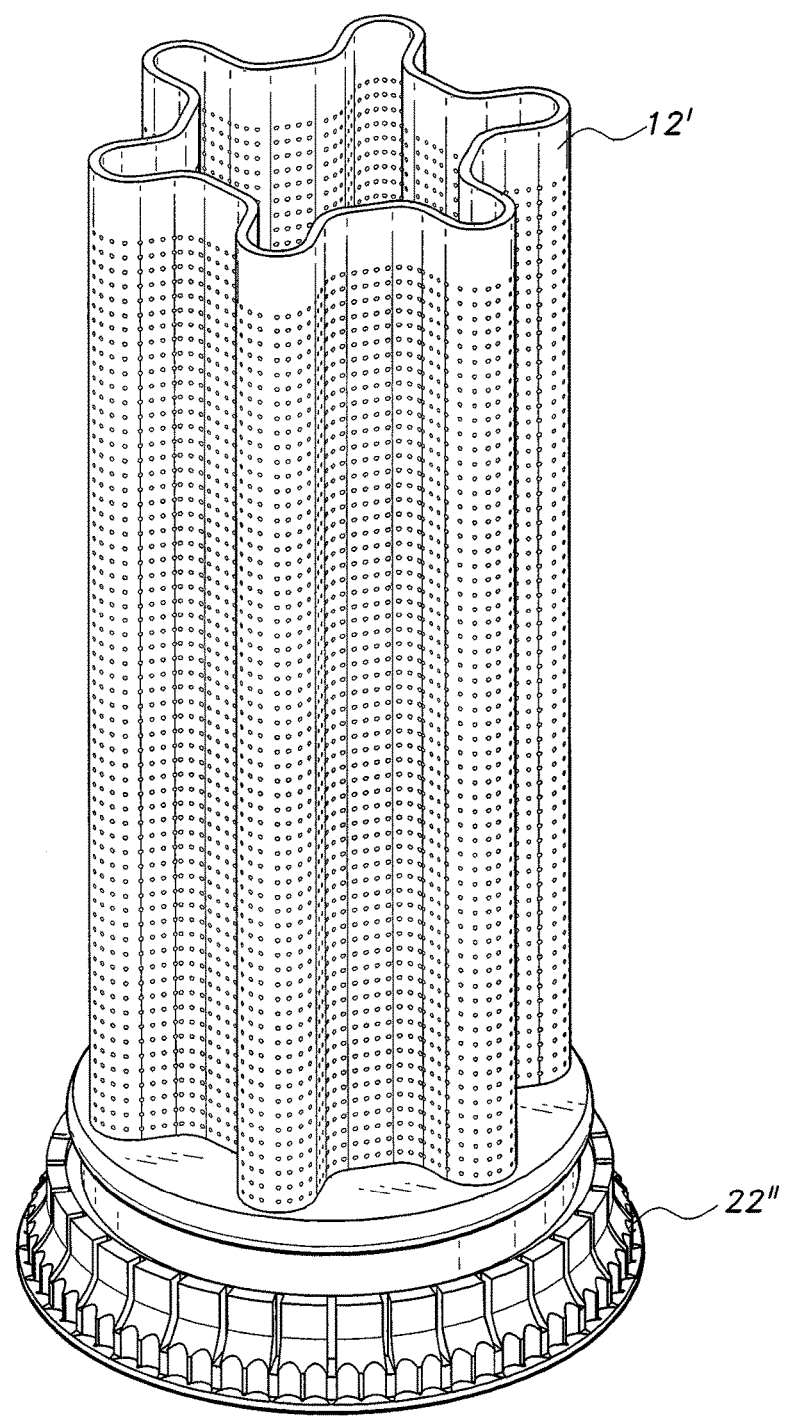
FIG. 10 is a front view of another alternative embodiment of a flame arrester according to the present invention, illustrating the foraminous cover that eliminates the use of a frame support.

FIG. 10 illustrates another embodiment of the flame arrester. The flame arrester is configured similar to the flame arrester of FIG. 7. However, in this embodiment, the flame arrester has removed the support frame 12. That is, the frame and cover are now integral as illustrated at 12'; thus, the separate support structure has been eliminated. This design contemplates that the foraminous sheet material 12" provides sufficient structural integrity and strength in itself so that a supporting frame is not necessary. The configuration of the sheet material 12" can be of any desired configuration so long as it provides sufficient structural integrity and strength in itself so that a supporting frame is not necessary. An exemplary fluted configuration is illustrated in FIG. 10. The first end cap 22" is similar to the other embodiments. The opposed second end cap (not shown) can be an end cap (porous or impervious) or check valve as desired. Accordingly, a wide variety of non-textile materials may be used to form the flame arrester 12'. A universal requirement is that the material be chemically resistant to the flammable fluid with which the flame arrester is used, and that it provides some resistance to heat and flame. The flame arrester 12' may be formed of such materials as carbon fiber, nonmetallic foraminous or porous sheet material. The pore size is on the order of 0.4 mm up to about 3.2 mm, the pore size being selected according to the specifications of the particular flammable fluid with which the flame arrester is used.

Accordingly, the flame arrester in its various embodiments provides a much needed advance in safety for relatively small containers of gasoline or other volatile liquid fuels. It is further contemplated that the frame 12 (which has been illustrated as being an elongate, generally cylindrical structure, preferably formed of a number of axially parallel elongate and flexible ribs 14, thereby defining a corresponding number of elongate slots or passages 16 therebetween) can be of any configuration, with or without ribs. The configuration being selected according to the strength needed with which the flame arrester is used.

It is to be understood that the present invention is not limited to the embodiments described above, but encompasses any and all embodiments within the scope of the following claims.

I claim:

1. A flame arrester, consisting of:
 a porous sleeve, the porous sleeve being formed of a foraminous sheet material, the sleeve having a first end and a second end opposite the first end, wherein the pore size is between 0.4 mm and 3.2 mm;
 a mounting flange at the first end; and
 the second end is selected from the group consisting of an impervious end cap; and
 wherein the porous sleeve has a fluted configuration, thereby providing structural integrity and strength to the porous sleeve.

2. A fuel storage unit and a flame arrester, comprising in combination:
 the fuel storage unit being a substantially closed container having a substantially tubular neck extending therefrom;
 the flame arrester consisting of:
  i) a porous sleeve, the porous sleeve being formed of a foraminous sheet material, the sleeve having a first end and a second end opposite the first end, wherein the pore size is between 0.4 mm and 3.2 mm;
  ii) a mounting flange at the first end; and
  iii) the second end is selected from the group consisting of an impervious end cap; and
 wherein the porous sleeve has a fluted configuration, thereby providing structural integrity and strength to the porous sleeve.

* * * * *